United States Patent

Mulry et al.

[11] Patent Number: 5,347,865
[45] Date of Patent: Sep. 20, 1994

[54] MEASURING SCOOP WITH MOLDED REUSABLE FIT CLIP

[75] Inventors: Patrick E. Mulry; Dennis J. Kool, both of Kentwood, Mich.; Mike B. Tyberghein, Marietta, Ga.; Donald S. Gura, Decatur, Ga.; Jeffrey D. Plyler, Duluth, Ga.

[73] Assignee: Amway Corporation, Ada, Mich.

[21] Appl. No.: 972,158

[22] Filed: Nov. 5, 1992

[51] Int. Cl.⁵ .................... G01F 19/00; B65D 77/10
[52] U.S. Cl. .......................... 73/427; 73/426; 30/328; 24/30.55; D10/46.2; D7/691
[58] Field of Search ................... 73/427, 429; 30/324, 30/328; 24/30.5 R, 30.5 S; D7/691, 692; D10/46.2

[56] References Cited

U.S. PATENT DOCUMENTS

| | | | |
|---|---|---|---|
| D. 136,022 | 7/1943 | Phillips . | |
| D. 167,580 | 8/1952 | McFarland . | |
| D. 182,456 | 4/1958 | Cronheim . | |
| D. 183,469 | 9/1958 | Ullman . | |
| D. 190,383 | 5/1961 | Hanson . | |
| D. 247,869 | 5/1978 | Montesi | D10/46.2 |
| D. 284,342 | 6/1986 | Campbell . | |
| D. 297,202 | 8/1988 | Zumwalt | D7/104 |
| D. 321,305 | 11/1991 | Underwood et al. | D7/691 |
| D. 331,023 | 11/1992 | Mulry et al. | D10/46.2 |
| 449,147 | 3/1891 | Welch | 73/427 |
| 1,425,456 | 8/1922 | Dial | D7/643 |
| 1,907,737 | 5/1933 | Christie | 30/328 |
| 2,099,430 | 11/1937 | Quea . | |
| 2,770,877 | 11/1956 | Bird . | |
| 2,795,043 | 6/1957 | Fleischer . | |
| 2,877,547 | 3/1959 | Feaster . | |
| 2,921,707 | 1/1960 | Sloan | 73/427 |
| 3,312,366 | 4/1967 | Poris | D10/46.2 |
| 3,334,805 | 8/1967 | Halbach . | |
| 3,527,269 | 9/1970 | Wilton | D10/46.2 |
| 4,043,203 | 8/1977 | Montesi | 73/427 |
| 4,428,134 | 1/1984 | Arnold et al. | 24/30.5 S |
| 4,783,886 | 11/1988 | Koppe | 24/30.55 |

FOREIGN PATENT DOCUMENTS 0747099  11/1966  Canada .............. 24/30.5 S

Primary Examiner—Diego F. F. Gutierrez
Attorney, Agent, or Firm—Michael A. Mohr; Jill M. Beckman

[57] ABSTRACT

A measuring scoop with molded reusable fit clip is disclosed. The measuring scoop includes a bowl with a scraping lip or shoulder used for more effectively lifting product into the bowl, an elongated handle which is integrally mounted on said bowl and a reusable fit clip on the free end of the handle, which clip is used for sealing closed a bag of product. The design of the handle as well as the design of the reusable fit clip extends the life of the molded friction fit clip by improving the clipping force as well as the clip's resistance to deformation from applied stress.

7 Claims, 4 Drawing Sheets

MEASURING SCOOP WITH MOLDED REUSABLE FIT CLIP

BACKGROUND OF THE INVENTION

This invention relates to an article used for measuring dry granular or liquid products and reclosing or resealing bags containing such products. More particularly, this invention relates to a measuring scoop with molded reusable fit clip which can be used for both measuring dry granular products and for reclosing bags used in the storage of such products.

Measuring scoops have been found to be useful not only in the culinary arts, but also in detergency applications in which consumers have found such devices to be an added convenience as they are able to determine the correct amount of detergent to be added to various types of soil and washing applications. Further, some types of detergents are packed in plastic or other types of storage bags which are then inserted into cardboard boxes for shipping and storage. The storage bag has been found useful in maintaining not only the freshness of the product stored, but also as an aid in preventing moisture from entering the enclosed product. For example, once the storage bag containing a detergent product is opened, the physical properties of the detergent can change in that granules often bridge to other granules forming "clumps" and, therefore, the granulation of the detergent may be affected. Additionally, exposure to air often results in the loss of fragrance and other volatile substances from the detergent. Therefore, it is important in detergent applications to provide some type of closure device for storage bags containing products whose effectiveness would be affected by exposure to air and moisture.

Numerous apparatus have been developed to fulfill one or the other of the above-referenced functions. However, both the measuring scoops and closure devices of the related art have several disadvantages. Regarding measuring scoops, it is often easy for a consumer to misplace or lose a measuring scoop between uses. Further, when the measuring scoop is inserted into the product bag or container after use, the measuring scoop often gets covered or buried in the product and is hard to locate when the consumer is again ready to use it.

Similarly, one of the disadvantages of the closure devices of the related art is that such devices are often small and easily misplaced. A further disadvantage of the closure devices of the related art is that the design of the device, as well as material composition, typically does not lend itself to extended usage as the closure device has little memory and with applied stress, the device is no longer suitable for its intended purposes.

SUMMARY OF THE INVENTION

In one embodiment of the invention the combination scoop and reusable fit clip is injection molded, which molding has the advantages of providing a finished product which is both durable and sturdy. The measuring scoop comprises a rectangularly-shaped bowl with a scraping lip extending out over the front edge of the bowl. Integrally mounted on the bowl is an elongated handle which tapers from its point of attachment to its free end. The handle has an arch-like shape and contains a channel. The tapering of the handle as well as the channel and the arched geometry of the handle provide for extension of the life of the reusable fit clip which is mounted on the free end of the handle. The reusable fit clip has a bifurcated angular channel opening and an oval reservoir in which the bag is held.

In another embodiment of the invention the combination scoop and reusable fit clip is molded by thermal forming, which process provides an advantage over injection molding in that the process is less expensive and quicker per finished product produced. In this embodiment the measuring scoop comprises a pentagonally-shaped bowl with a shoulder enclosing the bowl. The front shoulder joins to a curvature in the front wall so that the front shoulder can be utilized for lifting product into the bowl. A straight handle containing supporting channels is integrally mounted on the rear walls of the bowl. A flat shoulder which extends from the bowl encompasses the channels. Protruding through the front portion of the channels is a rib which originates in the bottom of the bowl and terminates in one end of the reusable fit clip. The reusable fit clip has a bifurcated angular channel opening and an oval reservoir in which the bag is held.

One of the advantages of the present invention over related art is that by using the measuring scoop as a closure means for the product bag, the consumer can easily locate the measuring scoop at any time the scoop is needed for measuring the contents of the product in the bag. An additional advantage of the present invention is that the front edge of the measuring scoop is provided with a scraping lip or a straight shoulder which provides a means for scraping or digging into the product in the bag, and therefore helping to lift product up so that it can easily be scooped into the bowl. A further advantage of the present invention is that the closure device is designed to resist deformation from applied stress. Additionally, the design of the handle improves the life and memory of the closure device and the applied closure force.

These and other objects, advantages and features of the invention will be more fully understood and appreciated by reference to the written specification and appended drawings.

DESCRIPTION OF THE PREFERRED EMBODIMENTS OF THE INVENTION

Figure 1:
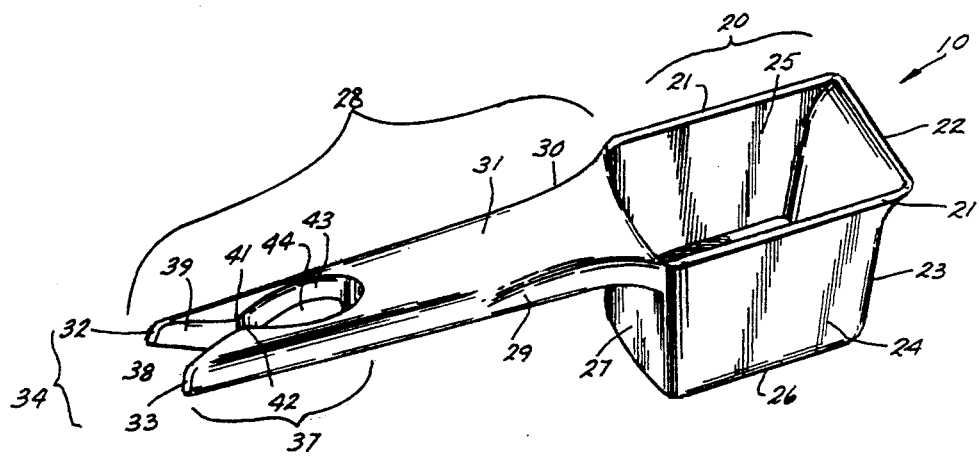
FIG. 1 is a right perspective view of one embodiment of the measuring scoop with molded reusable fit clip of the present invention.

With reference now to the figures, in one embodiment of the invention the measuring scoop with molded fit clip 10 is injection molded and includes rectangular bowl 20 with bowl bottom wall 26, bowl front wall 23, right bowl sidewall 24, left bowl sidewall 25 and bowl back wall 27, all terminating in bowl top edge 21. Scraping lip 22 is mounted on bowl front wall 23 at a 30° angle. Bowl bottom wall 26 is tapered at the corners to enhance easy storage, such as in a box. The bowl sidewalls 24, 25 or front wall 23 can contain measurement markings which can be used to enable the consumer to define the amount of detergent to be used in particular washing applications. The capacity of the bowl can range from 30 ml to 120 ml.

Figure 2:
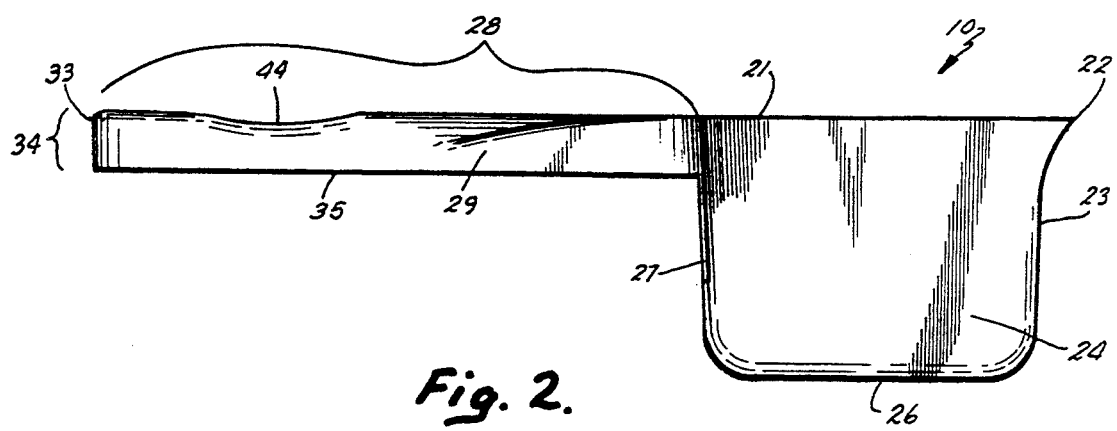
FIG. 2 is a right side elevational view thereof.
Figure 3:
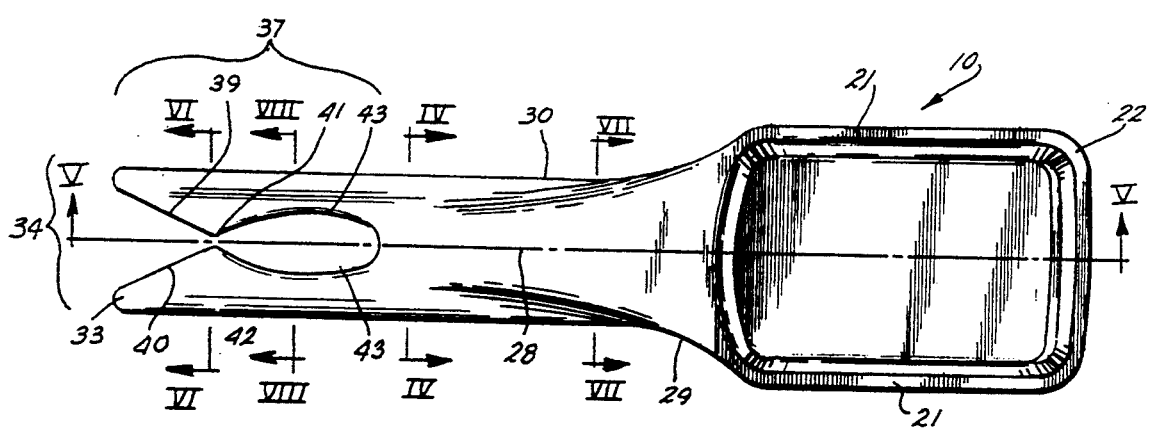
FIG. 3 is a top plan view thereof.
Figure 4:
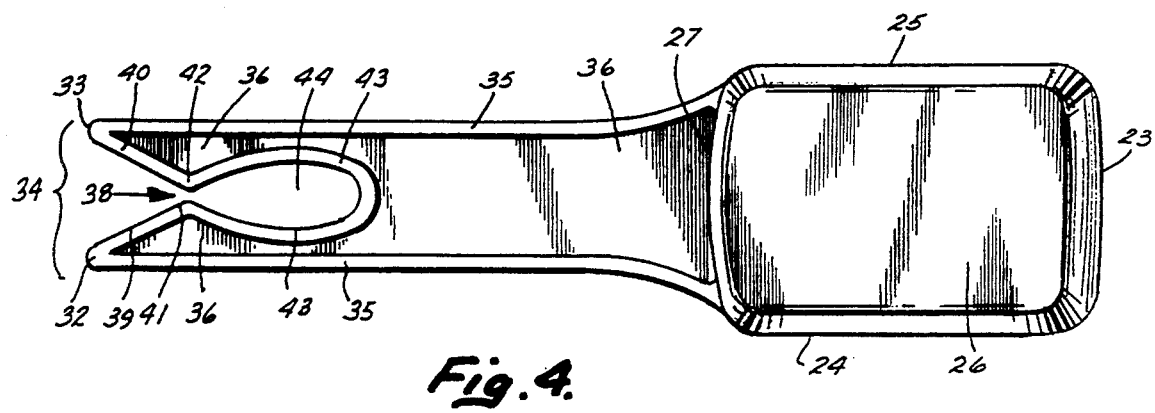
FIG. 4 is a bottom plan view thereof.
Figure 11:
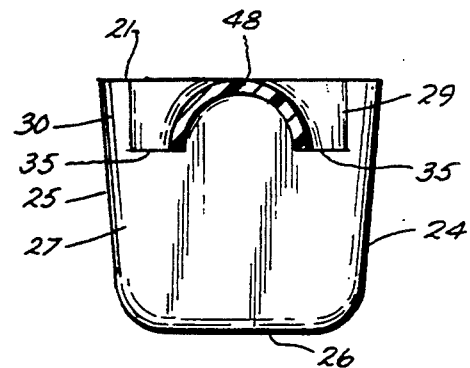
FIG. 11 is a rear sectional elevational view of the invention taken from section lines IV of FIG. 3 thereof.
Figure 12:
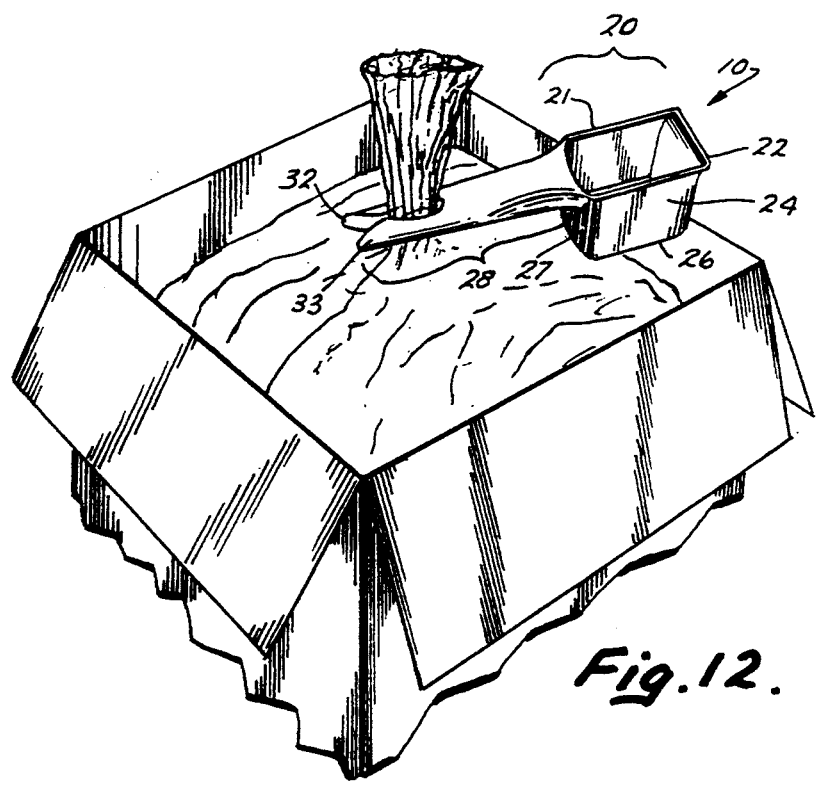
FIG. 12 is a view of one embodiment of the present invention attached as a closure device to a bag within a carton.

With reference now to FIGS. 1-4 and 11, a tapered, ergonomically designed elongated handle 28 is integrally mounted on bowl back wall 27. Tapered elongated handle 28 contains a first sidewall 29 and a second sidewall 30, which sidewalls taper into an arch 31 and said tapered elongated handle terminates in a first end point 32 and a second end point 33 as the tapered elongated handle travels from the bowl back wall 27 to the handle free end 34. The first sidewall 29 and second sidewall 30 terminate in transverse straight edge 35. Tapered elongated handle 28 contains a channel 36 which runs from bowl back wall 27 to first end point 32 and second end point 33.

Figure 5:
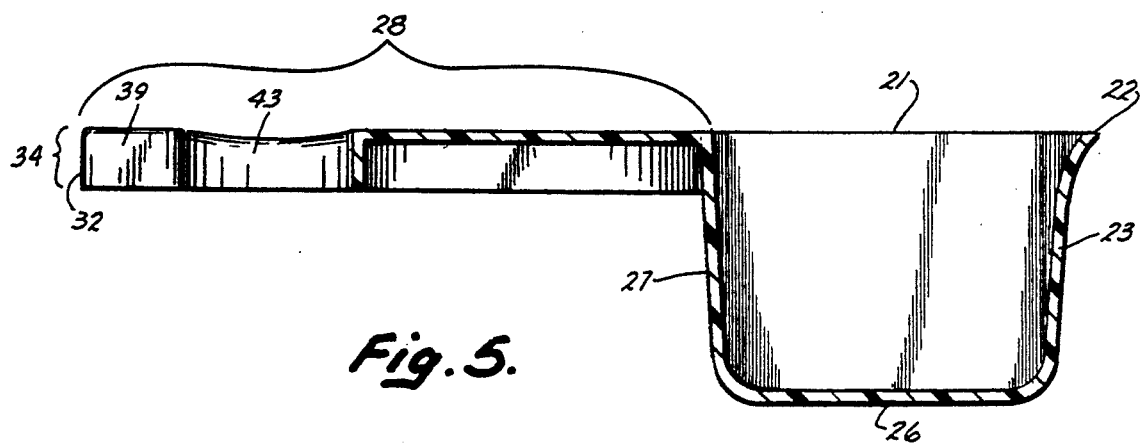
FIG. 5 is a right side sectional elevational view of the invention taken from section lines V of FIG. 3 thereof.
Figure 6:
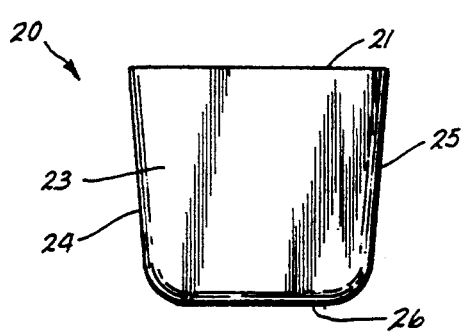
FIG. 6 is a front elevational view thereof.
Figure 7:
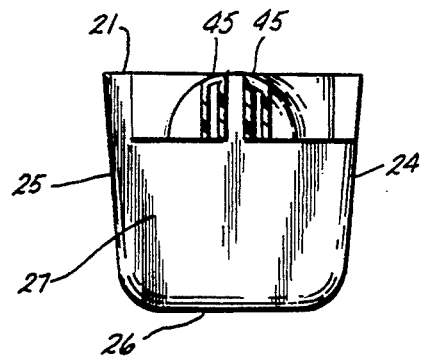
FIG. 7 is a rear sectional elevational view of the invention taken from section lines VI of FIG. 3 thereof.
Figure 8:
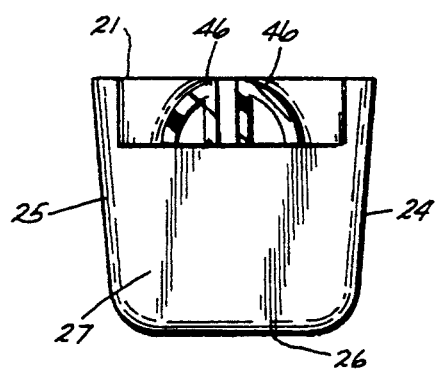
FIG. 8 is a rear sectional elevational view of the invention taken from section lines VIII of FIG. 3 thereof.
Figure 9:
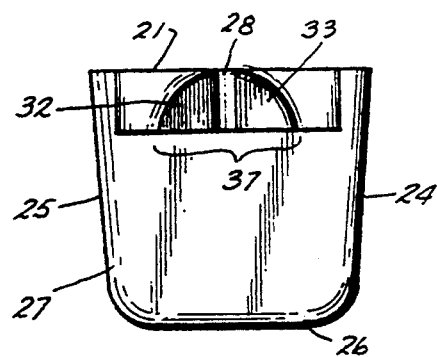
FIG. 9 is a rear elevational view thereof.
Figure 10:
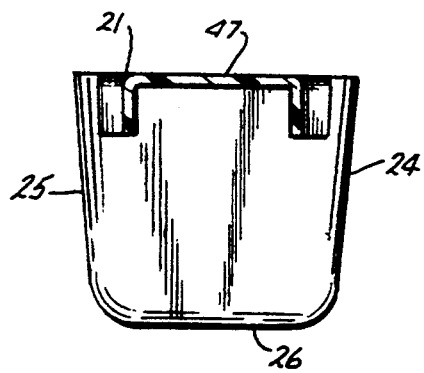
FIG. 10 is a rear sectional elevational view of the invention taken from section lines VII of FIG. 3 thereof.

Turning now to FIGS. 1-5 and 9, molded reusable fit clip 37 (FIGS. 1, 3, 4 and 9) comprises a bifurcated angular channel opening 38, first end point 32, second end point 33, first straight channeling wall 39 and second straight channeling wall 40, first converging edge 41 and second converging edge 42, concave reservoir wall 43 and an oval reservoir 44 for holding the bag in place.

In order to effectuate the molded reusable fit clip 37, a bag is brought into contact with the first end point 32 and second end point 33 and is thereafter guided into the oval reservoir 44 by pulling or pushing the bag along the first and second channeling walls 39, 40 through the bifurcated channel opening 38. As the bag is pushed or pulled through the channel opening 38, the converging edges 41, 42 flex outward to override the shape of the bag. As the bag comes into full contact with the concave reservoir wall 43 and comes to rest within the oval reservoir 44, the converging edges 41, 42 spring back and lock or close the bag into place. Consequently, the opening of the bag is both firmly held and positively secure insuring that the bag will not open and allow moisture or air to enter the dry product being stored.

Figure 13:
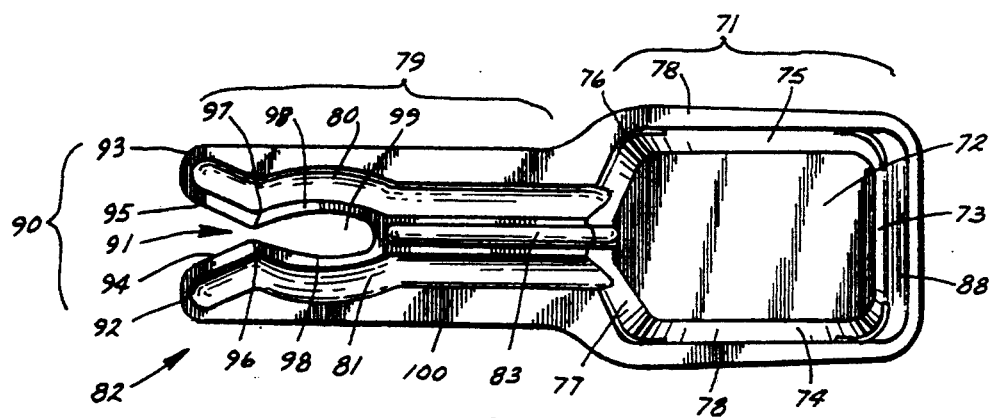
FIG. 13 is a top plan view of another embodiment of the measuring scoop with molded reusable fit clip of the present invention.
Figure 14:
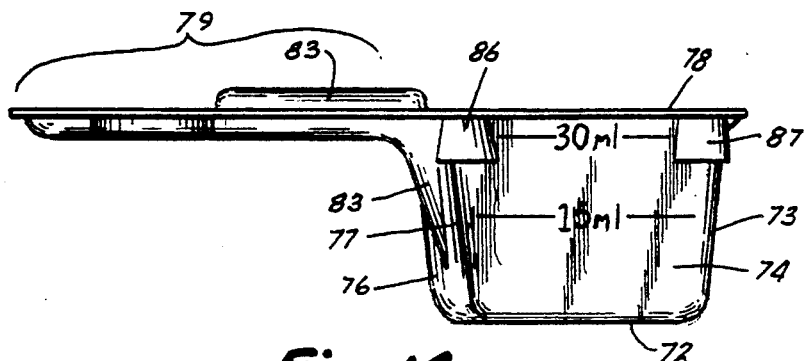
FIG. 14 is a right side elevational view thereof.
Figure 15:
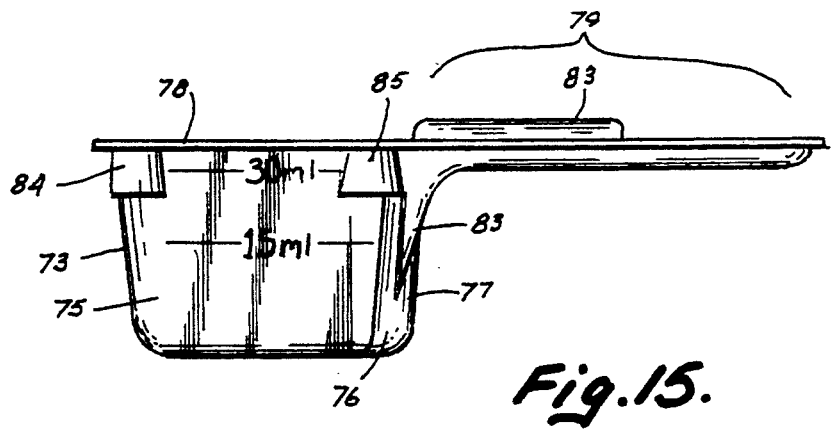
FIG. 15 is a left side elevational view thereof.
Figure 16:
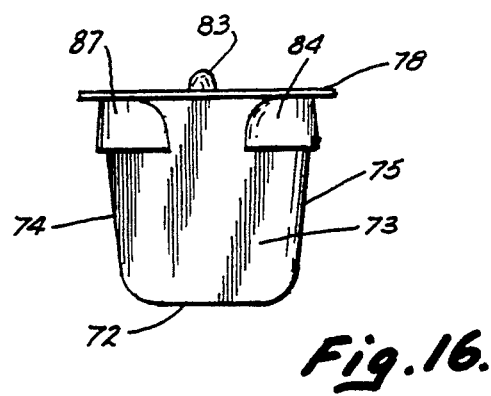
FIG. 16 is a front elevational view thereof.

With reference now to FIGS. 13-16, in another embodiment of the invention the measuring scoop with molded reusable fit clip 60 is thermal formed and includes pentagonal bowl 71 with bowl bottom wall 72, bowl front wall 73, right bowl sidewall 74, left bowl sidewall 75, a bowl back wall containing an L-shaped rounded ridge 83 which forms left bowl back wall 76 and right bowl back wall 77, all terminating in a top shoulder 78 on the bowl. Bowl bottom wall 72 is tapered at the corners. The bowl 71 contains four convex shelves with a first convex shelf 84 contained in the front wall 73 and left sidewall 75, a second convex shelf 85 contained in the left sidewall 75 and left bowl back wall 76, a third convex shelf 86 contained in the right bowl back wall 77 and right sidewall 74 and a fourth convex shelf 87 contained in the right sidewall 74 and front wall 73. The bowl front wall 73 contains a scraping edge 88. The bowl sidewalls 74, 75 or bowl front wall 73 can contain measurement markings which can be used to enable the consumer to define the amount of detergent to be used in particular washing applications. The capacity of the bowl 71 can range from 30 ml to 120 ml.

An elongated handle 79 is integrally mounted on left bowl back wall 76 and right bowl back wall 77 and travels in a straight line from said bowl back walls 76 and 77 to the handle's free end. The elongated handle 79 contains a left supporting channel 80 and a right supporting channel 81 on the elongated handle's face 82, which channels are further defined by flat shoulder 100. The left supporting channel 80 and right supporting channel 81 is separated by an L-shaped rounded ridge 83 which originates in bowl bottom wall 72, runs parallel to and is contained in left bowl back wall 76 and right bowl back wall 77, and thereafter terminates at one end of the molded reusable fit clip 90.

Molded reusable fit clip 90 comprises a bifurcated angular channel opening 91, first end point 92, second end point 93, first straight channeling wall 94, second straight channeling wall 95, first converging edge 96, second converging edge 97, concave reservoir wall 98 and an oval reservoir 99 for holding the bag in place. The molded reusable fit clip 90 is effectuated by a bag being brought into contact with the first and second end points 92, 93 and thereafter guided into the oval reservoir 99 by pulling or pushing the bag along the first and second channeling walls 94, 95 through the bifurcated angular channel opening 91. As the bag is pushed or pulled through the channel opening 91 converging edges 96, 97 flex outward to override the shape of the bag. As the bag comes into full contact with the concave reservoir wall 98 and comes to rest within the oval reservoir 99, the converging edges 96, 97 spring back and lock or close the bag into place. Consequently, the opening of the bag is both firmly held and positively secure insuring that the bag will not open and allow moisture or air to enter the dry product being stored.

The above description is considered to be that of the preferred embodiments only. Modifications of the invention will occur to those who make and use the invention. The true scope and spirit of the invention is to be determined by reference to the appended claims.

What is claimed is:

1. A combination measuring scoop and bag closure apparatus comprising:

a bowl;

an elongated handle integrally mounted on said bowl on one end and said elongated handle containing a free end;

a resilient closure means on said free end of said elongated handle for locking closed a bag; and wherein said bowl is pentagonally-shaped having a rounded bottom wall integrated with a first and a second straight sidewall, a front wall and a left back wall and right back wall separated by an L-shaped ridge.

2. A combination measuring scoop and bag closure apparatus comprising:
   a bowl;
   an elongated handle integrally mounted on said bowl on one end and said elongated handle containing a free end;
   a resilient closure means on said free end of said elongated handle for locking closed a bag;
   wherein said bowl is pentagonally-shaped having a rounded bottom wall integrated with a first and second straight sidewall, a front wall and a left back wall and right back wall separated by an L-shaped ridge; and
   said bowl having a scraping shoulder mounted on said front wall.

3. A combination measuring scoop and bag closure apparatus comprising:
   a bowl;
   an elongated handle integrally mounted on said bowl on one end and said elongated handle containing a free end;
   a resilient closure means on said free end of said elongated handle for locking closed a bag;
   wherein said bowl is pentagonally-shaped having a rounded bottom wall integrated with a first and second straight side wall, a front wall and a left back wall and right back wall separated by an L-shaped ridge; and
   wherein said elongated handle is integrally mounted on said left back wall and said right back wall and said handle travels in a straight line from said left and right back wall to said handle's free end.

4. A combination measuring scoop and bag closure apparatus comprising:
   a pentagonally-shaped bowl with a scraping shoulder mounted on a top edge of said bowl;
   an elongated straight handle integrally mounted on said bowl on one end and said handle containing a free end which terminates in a reusable fit clip; and
   said elongated handle further comprising a left and right channel on a face of said handle, said channels being bifurcated by an L-shaped rounded ridge and said channels further defined by a flat shoulder enclosing said channels.

5. A combination measuring scoop and bag closure apparatus comprising:
   a bowl;
   an elongated handle integrally mounted on said bowl on one end and said elongated handle containing a free end;
   a resilient closure means on said free end of said elongated handle for locking closed a bag;
   said bowl having a first convex shelf contained in said front wall and said left sidewall, a second convex shelf contained in said left sidewall and said left back wall, a third convex shelf contained in said right back wall and said right sidewall and a fourth convex shelf contained in said right sidewall and said front wall; and
   wherein said bowl is pentagonally-shaped having a rounded bottom wall integrated with a first and a second straight sidewall, a front wall and a left back wall and right back wall separated by an L-shaped ridge.

6. A combination measuring scoop and bag closure apparatus comprising:
   a bowl;
   an elongated handle integrally mounted on said bowl on one end and said elongated handle containing a free end;
   a resilient closure means on said free end of said elongated handle for locking closed a bag;
   wherein said elongated handle is integrally mounted on said left back wall and said right back wall and said handle travels in a straight line from said left and right back wall to said handle's free end;
   said handle further comprising a left supporting channel and a right supporting channel on a face of said handle, said supporting channels being further defined by a flat shoulder which encloses said supporting channels, said supporting channels originating in said left and right back wall and terminating at said free end of said handle;
   wherein said channels are bifurcated by an L-shaped ridge, said ridge originating in said bottom wall of said bowl and terminating at one end of said resilient closure means; and
   wherein said blow is pentagonally-shaped having a rounded bottom wall integrated with a first and a second straight sidewall, a front wall and a left back wall and right back wall separated by said L-shaped ridge.

7. A combination measuring scoop and bag closure apparatus comprising:
   a pentagonally-shaped bowl with a scraping shoulder mounted on a top edge of said bowl;
   an elongated straight handle integrally mounted on said bowl on one end and said handle containing a free end which terminates in a reusable fit clip; and
   said elongated handle further comprising a left and right channel on a face of said handle, said channels being bifurcated by an L-shaped rounded ridge and said channels further defined by a flat shoulder enclosing said channels;
   said reusable fit clip further comprising a first and a second end point, a bifurcated angular channel opening, a first and a second channeling wall, a first and a second converging edge and an oval reservoir with a concave wall, wherein when a bag is brought into contact with said first and said second end point, said bag is guided into said reservoir by pulling or pushing said bag along said first and said second channeling walls, said converging edges flexing outward to receive the bag and springing back around said bag when said bag comes into full contact with said concave reservoir wall.

* * * * *